No. 614,293. Patented Nov. 15, 1898.
J. DAVIDSON & C. G. HEPBURN.
PROCESS OF AND APPARATUS FOR REFINING OILS.
(Application filed June 12, 1897.)
(No Model.)

Witnesses:
E. B. Bolton

Inventors:
James Davidson
Charles Graham Hepburn
By
their Attorneys.

THE NORRIS PETERS CO., PHOTO-LITHO., WASHINGTON, D. C.

UNITED STATES PATENT OFFICE.

JAMES DAVIDSON AND CHARLES G. HEPBURN, OF SYDNEY, NEW SOUTH WALES.

PROCESS OF AND APPARATUS FOR REFINING OILS.

SPECIFICATION forming part of Letters Patent No. 614,293, dated November 15, 1898.

Application filed June 12, 1897. Serial No. 640,555. (No model.)

*To all whom it may concern:*

Be it known that we, JAMES DAVIDSON and CHARLES GRAHAM HEPBURN, subjects of the Queen of Great Britain and Ireland, residing at Sydney, in the Colony of New South Wales, have invented certain new and useful Improvements in Processes of and Apparatus for Refining Fats and Oils, of which the following is a specification.

This invention has been patented in England under date of June 11, 1897, No. 14,238.

In the refining of fats and oils, and especially in the refining of tallow, filtering by known methods is a slow and imperfect process. Fats must be rendered to the liquid form to undergo filtration, and as they should not for well-known reasons be run while still hot into barrels or other packages they are usually cooled off in tanks before being packed.

It has been suggested to effect filtration by passing the oil or fat through a centrifugal machine of the hydro-extractor class having a fabric lining, such as moleskin, in the basket; and it has also been suggested to blow cool air through the liquefied fat for the purpose of cooling it.

With a view to improving these operations we have devised the apparatus illustrated in the accompanying drawings. A long series of experiments was made to test the suitability of various substances for filtering media, sand, charcoal, cork-shavings, vegetable fiber, hemp, cotton-waste, and cotton-wool being used with lining-bands of various fabrics, all with unsatisfactory results, though in some cases a limited success was attained. Sawdust was, however, found to suit substantially all requirements and to have a high efficiency.

The apparatus consists, essentially, of a filtering-bed of sawdust carried in a centrifugal basket, the rotation of which forces the filtrate through the sawdust, and a cooler arranged to receive the spray of filtrate from the basket and reduce its temperature.

Figure 1:
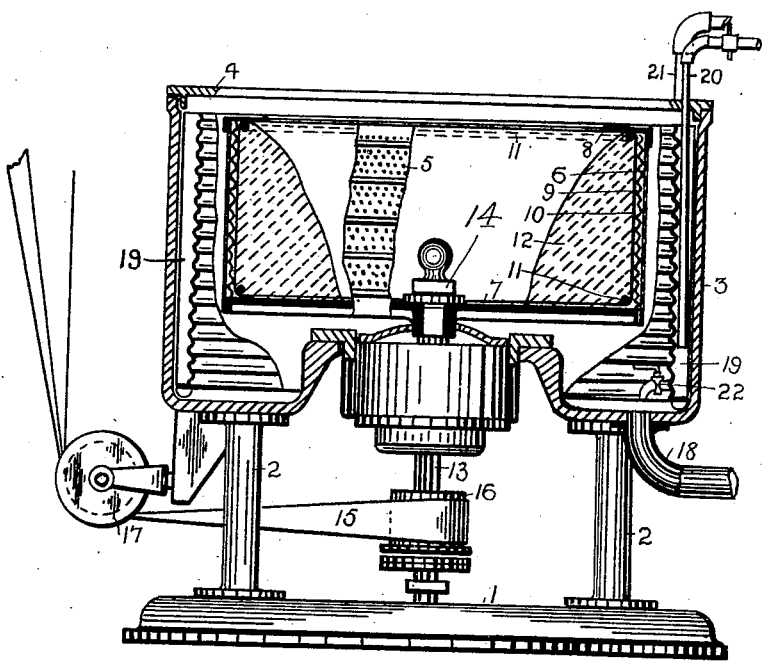
Figure 2:
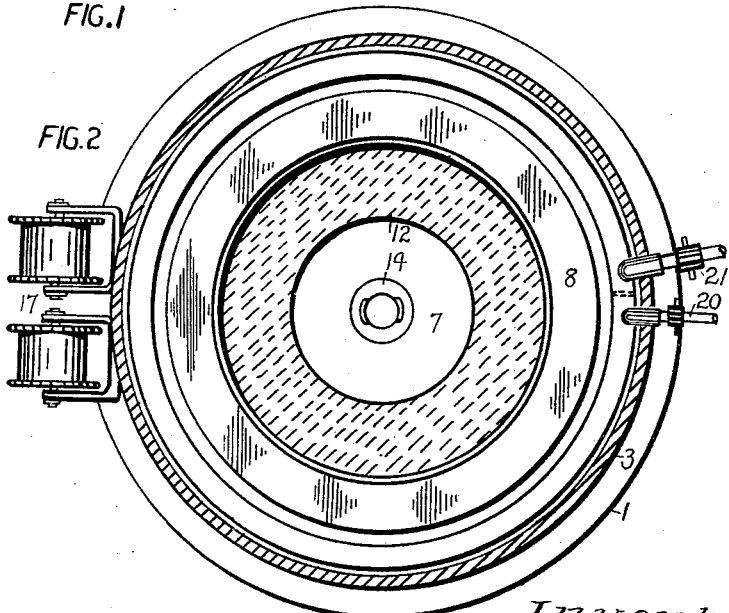

In the annexed sheet of explanatory drawings, Figure 1 is a vertical sectional elevation of our apparatus, and Fig. 2 a horizontal section through same on line below rim of monitor.

1 is the bed-plate; 2, pillars; 3, monitor-casing; 4, rim of monitor; 5, perforated metal shell of basket 6; 7, bottom plate of basket; 8, flange of basket; 9, spring-wire lining of basket; 10, fabric lining; 11, spring retaining-rings for fabric 10; 12, sawdust filtering-bed; 13, spindle of basket; 14, holding-down nut; 15, driving-belt; 16, fast pulley on spindle 13; 17, guide-pulleys; 18, filtrate-pipe; 19, cooler; 20, water-supply; 21, water-discharge from cooler 19; 22, drain-tap.

The rotating basket 6, which is usually made of woven wire, is lined internally with a band 10 of any textile substance which will allow fluid fats and oils to pass through it freely, but will retain fine particles of sawdust. This band should have a bottom piece sewed into it, which will lie on the bottom 7 of the basket and be fastened down by screwing on the nut 14, a hole being made to allow the end of the spindle 13 to pass through. By this construction unfiltered liquid is prevented from passing to the basket-shell. In operation there is a tendency for the wash of the feed to undermine the wall of sawdust, and when the sawdust wall becomes thinned in this way unfiltered liquid is liable to work its way along the bottom of the basket and escape unfiltered. The covering of the bottom of the basket, as described, insures the passing of all filtrate through the fabric lining. When the basket is made of perforated plates, as shown at 5, it is advisable to place a piece of open wire-cloth or woven wire 9, such as is used in woven-wire mattresses, between the fabric lining 10 and the shell 6 of the basket, in order that the filtrate may pass freely to the perforations. The band 10 is held in place by a pair of spring-rings 11, to which its upper and lower edges are attached by sewing. The basket so lined is charged with a sufficiency of sawdust to form a thick filtering-bed. The quantity will depend on the capacity of the basket. We have obtained maximum advantages when the thickness of the sawdust bed or belt averaged six inches to one foot. A white sawdust must be used, as the coloring-matters of dark sawdust wash out and stain the fat or oil under treatment. A dark sawdust might, however, be used if first washed and decolorized. When the basket is rotated at its normal running speed, the sawdust will heap itself up around the periphery by centrifugal action, as indicated in the drawings. It is not necessary to keep the sawdust bed of uniform thickness from top to bottom.

There is no novelty in the mounting of the monitor 3, or in the mounting of the basket 6, or in the belt arrangement.

The cooler consists of an annular water-chamber with a diaphragm to direct the circulation and is placed in the space between the basket and the monitor. A water-service 20 enters it at one side of the diaphragm, which is a cross vertical partition, and the inflow-pipe is led to the bottom. On the other side of the diaphragm, at the top of the chamber, the outflow-pipe is connected. Water sent into the cooler makes a complete course through it before finding egress. The inner wall of the cooler is made of corrugated metal, in order to obtain a maximum surface. The drain-cock 22 is provided for emptying the cooler when necessary.

The rotation of the basket induces a powerful air-current in the space between the basket and the cooler. The fine spray of fat or oil thrown off by the basket becomes considerably cooled by the action of this draft before it reaches the wall of the cooler. Owing to the finely-divided form of the spray, a very rapid cooling is obtained, every particle of the filtrate being exposed to the action of the air-current and to contact with the wall of the cooler.

In operation the fat, heated sufficiently high to make it freely liquid, or the oil to be refined is poured in a stream into the middle of the basket, which is kept rotating at a peripheral speed of fifteen hundred to four thousand feet per minute. At the same time cold water is supplied continuously to the water-chamber. The centrifugal action due to the rotation of the basket forces the fluid fat or oil through the sawdust at a rapid rate, at the same time compacting the sawdust. The solid and glutinous and other matters capable of being filtered out are retained by the sawdust, while the purified fat or oil is thrown off by the basket in the form of a spray, which falls upon the corrugated wall of the water-chamber 19, forming a film thereon and dripping off into the bottom of the monitor, whence it passes to the packages through the pipe 18. This operation is continued until the filtering media become clogged and incapable of passing a sufficient volume of fluid, when the machine is brought to rest and a spare basket substituted, the spent filters being meantime replaced or cleaned. If the surface layer of the sawdust only becomes gluey, it may be freed by harrowing it, which is done by holding a chisel or piece of wood or metal lightly in contact with it, traversing vertically, while the basket is in motion. In the refining of badly-made tallow many and various impurities are extracted. Very often a considerable quantity of glue-like substances are present and the filtering substances become clogged very quickly unless the precaution is taken of first rerendering the fat and allowing it to settle in tanks and drawing it off from the top for treatment. The lowermost layers are poor in pure fat and are more troublesome to refine than the purer and lighter fluid. The fabric band 10 will usually be found to be fouled before the sawdust.

When fats are being treated, the water-supply to the chamber 19 should be so regulated by the inflow-cock that the fat will be a little above solidifying temperature as it passes from the pipe 19 into the packages. To clean off any solidified fat, hot water may be run into the chamber 19.

It is evident that said filtering apparatus is usable without the cooler.

Having now particularly described and ascertained the nature of the said invention and in what manner the same is to be performed, we declare that what we claim is—

1. In combination, the centrifugal basket, the sawdust around the same and the fabric lining extending around the sides of the basket and across the bottom to retain the sawdust in place and to protect the sawdust at the bottom of the side wall from becoming undermined, substantially as described.

2. The herein-described process of filtering oil and fat consisting in subjecting the same to centrifugal force in connection with a filter-bed and then subjecting the same while in spray form to the action of a cooling medium and after said spray has passed through an air-space, substantially as described.

3. In combination, the centrifugal basket, and an annular cooler surrounding the same with an air-space between the basket and cooler communicating through its annular upper opening with the outer air across which space the spray is thrown to be cooled by the air, substantially as described.

In witness whereof we have hereunto set our hands in the presence of two witnesses.

JAS. DAVIDSON.
C. G. HEPBURN.

Witnesses:
 W. I. SPINSON,
 W. I. DAVIS.